US006348779B1

(12) United States Patent
Sluijs

(10) Patent No.: US 6,348,779 B1
(45) Date of Patent: Feb. 19, 2002

(54) DC/DC UP/DOWN CONVERTER

(75) Inventor: Ferdinand Jacob Sluijs, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/630,667

(22) Filed: Aug. 1, 2000

(30) Foreign Application Priority Data

Aug. 3, 1999 (EP) .............................................. 99202552

(51) Int. Cl.$^7$ ............................ G05F 1/10; H02M 3/335
(52) U.S. Cl. ......................................... 323/222; 363/19
(58) Field of Search ................................. 323/222, 223, 323/266, 282, 284, 285; 363/19, 21, 23, 25

(56) References Cited

U.S. PATENT DOCUMENTS

| 4,618,812 A | * 10/1986 | Kawakami | ................... 323/224 |
| 5,235,504 A | * 8/1993 | Sood | ........................... 363/53 |
| 5,552,694 A | * 9/1996 | Appeltans | ................... 323/222 |

FOREIGN PATENT DOCUMENTS

WO        9534121  A1      12/1995

* cited by examiner

Primary Examiner—Rajnikant B. Patel
(74) Attorney, Agent, or Firm—Steven R. Biren

(57) ABSTRACT

A DC/DC up/down converter (10), comprising first and second input terminals (20, 21); first and second output terminal (30, 31); a coil (L); first switching means (S1) operatively connected to provide a conduction path from said first input terminal (20) to said coil (L) second switching means (S2) operatively connected to provide a conduction path from said first switching means (S1) and said coil (L) to said second input terminal (21); third switching means (S3) operatively connected to provide a conduction path from said coil (L) to said first output terminal (30); fourth switching means (S4) operatively connected to provide a conduction path from said coil (L) and said third switching means (S3) to said second output terminal (31); control means (11) operatively connected for controlling said switching means (S1, S2, S3, S4); reference voltage means (12) for providing a reference voltage (Vr); and comparator means (13) for providing a comparison signal (Vc) for said control means (11) in response to comparison of an output voltage (Vo) at said output terminals (30, 31) with said reference voltage (Vr), characterized in that said control means (11) are arranged for controlling said switching means (S1, S2, S3, S4) in a three phase conversion cycle wherein phase 1 ($\Phi$1) comprising said first switching means (S1) and said fourth switching means (S4) in a conductive state and said second switching means (S2) and said third switching means (S3) switched in a non-conductive state; phase 2 ($\Phi$2) comprising said first switching means (S1) and said third switching means (S3) in a conductive state and said second switching means (S2) and said fourth switching means (S4) switched in a non-conductive state; phase 3 ($\Phi$3) comprising said second switching means (S2) and said third switching means (S3) in a conductive state and said first switching means (S1) and said fourth switching means (S4) in a non-conductive state.

8 Claims, 4 Drawing Sheets

| Phase | S1 | S2 | S3 | S4 |
|---|---|---|---|---|
| Φ1 | On | Off | Off | On |
| Φ2 | On | Off | On | Off |
| Φ3 | Off | On | On | Off |
| Φ4 | Off | Off | Off | Off |

DC/DC UP/DOWN CONVERTER

BACKGROUND OF THE INVENTION

The invention relates to a DC/DC up/down converter, comprising:
- first and second input terminals;
- first and second output terminal;
- a coil;
- first switching means operatively connected to provide a conduction path from said first input terminal to said coil;
- second switching means operatively connected to provide a conduction path from said first switching means and said coil to said second input terminal;
- third switching means operatively connected to provide a conduction path from said coil to said first output terminal;
- fourth switching means operatively connected to provide a conduction path from said coil and said third switching means to said second output terminal;
- control means operatively connected for controlling said switching means;
- reference voltage means for providing a reference voltage; and
- comparator means for providing a comparison signal for said control means in response to comparison of an output voltage at said output terminals with said reference voltage.

A DC/DC up/down converter of this type is known from International patent application WO 95/34121 of applicant.

This known switched DC/DC converter is a combination of a so-called boost and buck converter. In the boost mode, the first switching means are in a conductive state, i.e. closed, and the second switching means are non-conductive, i.e. open. The third and fourth switching means are operated for up-converting an input voltage applied at the input terminals.

In the buck mode, the third switching means are closed and the fourth switching means are open, such that with the first and second switching means the input voltage can be down-converted to an output voltage lower than the input voltage.

A "direct" converter is realized by directly coupling the input voltage, applied at the input terminals, to the output terminals, by closing the first and third switching means and opening the second and fourth switching means.

For voltage regulation purposes, the known DC/DC converter individually switches between the three possible modi, i.e. the boost mode, the buck mode and the direct mode, following a reference voltage window determined by a first (high) and a second (low) reference voltage. If the output voltage in the direct converter mode becomes lower than the (low) second reference voltage, the converter is switched to its boost mode of operation. If the output voltage in the direct converter mode rises above the (high) first reference voltage, the converter is switched to the buck mode configuration. Due to the switched operation of the converter, at the output voltage a low frequency (LF) voltage ripple is induced.

In practice, it has been found that for a number of supply voltage sensitive applications, the LF voltage ripple caused by the reference voltage window, is not acceptable.

SUMMARY OF THE INVENTION

Accordingly, it is an object of the invention to provide an improved DC/DC up/down converter having a less output voltage ripple due to the switched control of the converter.

This is, according to the invention, achieved in that the control means are arranged for controlling the switching means in a three phase conversion cycle wherein
- phase 1 comprising said first switching means and said fourth switching means in a conductive state and said second switching means and said third switching means in a non-conductive state;
- phase 2 comprising said first switching means and said third switching means in a conductive state and said second switching means and said fourth switching means in a non-conductive state;
- phase 3 comprising said second switching means and said third switching means in a conductive state and said first switching means and said fourth switching means in a non-conductive state.

Instead of applying the up- and down-conversion sections of the converter separately or individually, in the converter according to the invention a combined three phase control of the switching means is provided. With the three phase control according to the present invention, no voltage window is required for regulating the output voltage of the converter, thereby achieving a less disturbing output voltage ripple.

In a further embodiment of the invention, by adding a fourth phase wherein the switching means are all in a non-conductive state, the converter can be operated in a continuous or PWM (Pulse With Modulation) mode, wherein the current through the coil does not become zero and in a discontinuous or PFM (Pulse Frequency Modulation) mode wherein the current through the coil becomes zero. In the PWM mode the time duration of the fourth phase is zero whereas in the PFM mode the fourth phase introduces a wait period wherein the current through the coil becomes zero. Thus, a zero length wait cycle is associated with PWM and a non-zero length wait cycle is associated with PFM. Switching between PFM and PWM can be made automatically. The length of the wait cycle determines the type of mode.

In a preferred embodiment of the converter according to the invention, the first and second phase have a fixed duration, whereas the duration of the third phase is varied for output voltage regulation purposes.

In PFM or discontinues mode, the third phase ends at a predefined length or when the current through the coil becomes zero. Then, the control means waits until the output voltage drops below the reference level, to start a new conversion cycle with phase 1.

Preferably, switching means constructed as MOS (Metal Oxide Semiconductor) transistor means are used, having their control terminal (gate) connected with the control means for controlling the closed or open state of the transistors.

In a further embodiment of the invention, the second switching means are replaced by a first diode, arranged to provide a conductive path from the second input terminal to the first switching means and the coil, and the third switching means are replaced by a second diode arranged to provide a conductive path from the coil to the first output terminal.

The second and third switching means are optional, however if used, these switches increase the power conversion efficiency of the DC/DC converter by having none or a much less voltage drop in their conductive state compared to diodes. Those skilled in the art will appreciate that, in a practical embodiment, a parallel arrangement of the second switching means and the first diode as well as a parallel arrangement of the third switching means and the second diode is of advantage, for protection purposes of the second and third switching means, in particular if MOS transistors are used as switching means.

Preferably, the DC/DC up/down converter according to the invention comprises a smoothing capacitor connected across the output terminals.

The invention also relates to a power supply comprising a DC/DC up/down converter as disclosed above, and arranged for receiving an input voltage at the first and second input terminals and for providing an output voltage at the first and second output terminals.

The DC/DC converter according to the invention is of particular advantage if applied in a portable electronic appliance, such as, but not limited to, camera chips and the like.

BRIEF DESCRIPTION OF THE DRAWING

The invention will now be described in more detail with reference to the accompanying drawings, wherein.

DESCRIPTION OF THE PREFERRED EMBODIMENTS

Figure 1:
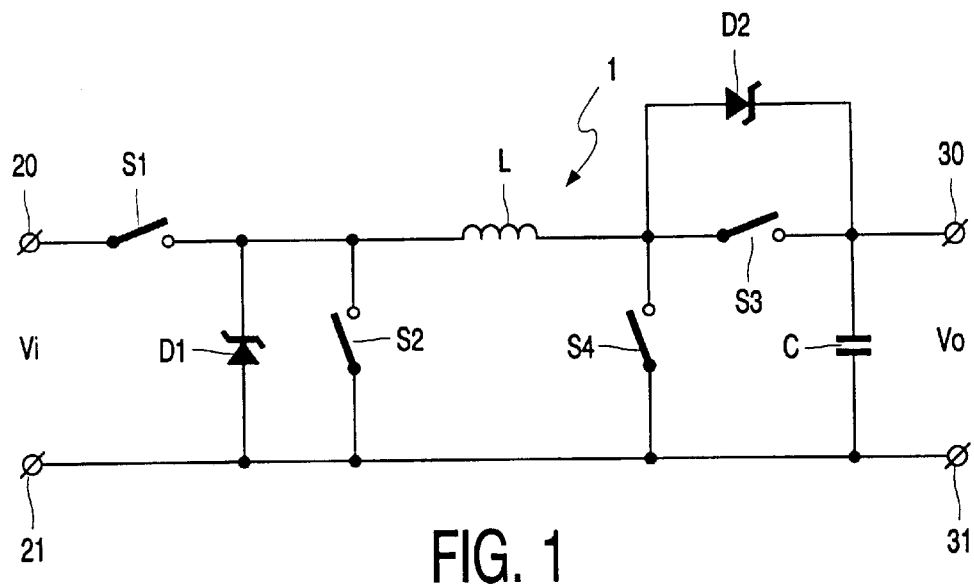
FIG. 1 shows a circuit diagram of a prior art DC/DC up/down converter.

The prior art DC/DC up/down converter 1 of FIG. 1, is in principle a combination of a boost and buck converter.

First switching means S1 and second switching means S2 are series connected between a first input terminal 20 and a second input terminal 21. Third switching means S3 and fourth switching means S4 are series connected between a first output terminal 30 and a second output terminal 31. A coil L is connected between the connecting points of the first and second switching means S1, S2 and the connection point of the third and fourth switching means S3, S4. A first diode D1 is parallel connected with the second switching means S2 and provides a current conductive path from the second input terminal 21. A second diode D2 is parallel connected with the third switching means S3 and provides a conductive path between the coil L and the first output terminal 30. A smoothing capacitor C is parallel connected with the first and second output terminals 30, 31. The second input terminal 21 and the second output terminal 31 connect through a common conductive path, for example the earth or mass of an electronic appliance.

As disclosed in WO 95/34121, the converter 1 is operated to provide a regulated output voltage Vo at the output terminals 30, 31 in response to an input voltage Vi at the input terminals 20, 21. To this end, a voltage reference window is provided, determined by a first (high) reference voltage level and a second (low) voltage reference level. The circuit is operated such that, if the output voltage Vo remains within the reference window, the direct conversion mode is maintained, in which the first and third switching means S1, S3 are switched in a conductive state and the second and fourth switching means S2, S4 are switched in a non-conductive state.

If the output voltage becomes lower then the lower reference voltage, the converter 1 is switched to its boost converter configuration, wherein the first switching means S1 are closed (i.e. switched in a conductive state) and the second switching means S2 are open (i.e. in a non-conductive state). The third and fourth switching means S3, S4 are switched such that energy in the coil L can be build up, resulting in an output voltage Vo higher than the input voltage Vi.

If the output voltage Vo in the direct converter mode rises above the higher reference voltage, the converter 1 is switched to its buck converter configuration, wherein the third switching means S3 are closed and the fourth switching S4 are open. The first and second switching means S1, S2 are switched such that less energy is build up in the coil L, which eventually will lower the output voltage Vo.

Figure 2:
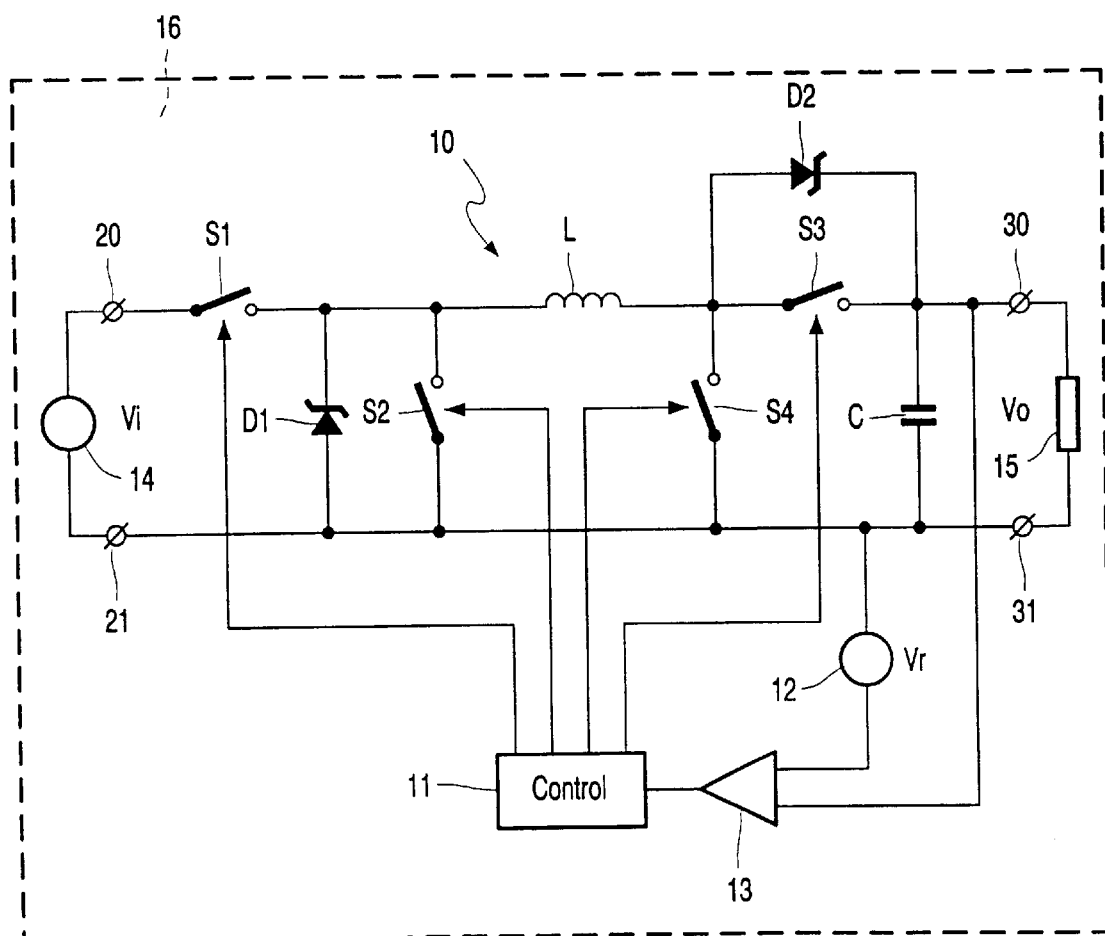
FIG. 2 shows a circuit diagram of the DC/DC up/down converter according to the present invention in an electronic appliance.

FIG. 2 shows a circuit diagram of an implementation, in an electronic appliance 16, like a portable video camera illustratively shown in broken lines, of a single reference DC/DC up/down converter 10 according to the present invention, wherein control means 11 operatively connect to each of the switching means S1, S2, S3, S4. Comparator means 13 provide a control signal to the control means 11 by comparing the output voltage Vo at the first output terminal 30 and a reference voltage Vr applied at or provided by reference voltage means 12.

The control means 11 are arranged to switch the switching means S1, S2, S3, S4 separately into their conductive or non-conductive state. In the case of MOS (Metal Oxide Semiconductor) transistor switching means, the control means 11 are arranged to apply suitable control voltages to the gate terminals of the respective MOS transistors. Preferably, the first and third switching means are PMOS transistors and the second and third switching means are constructed as an NMOS transistor. The use of a PMOS transistor instead of an NMOS transistor has the advantage that the gate voltage need not be larger than the output voltage of the power supply in order to turn on this transistor.

At output terminals 30, 31 a load 15 of the electronic appliance 16 connects. At input terminals 20, 21 voltage source means 14, such as a battery, connect.

Figure 3A:
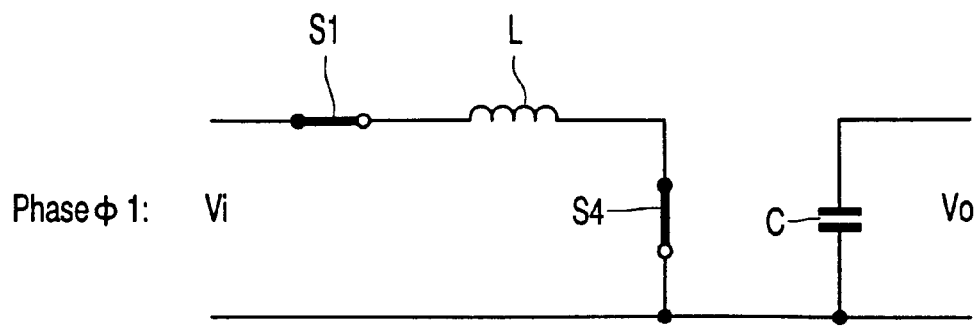
FIG. 3a, b, c show, in a circuit diagram representation, the three phase conversion scheme of the DC/DC up/down converter according to the present invention.

In accordance with the present invention, a typical conversion cycle of the converter 10 comprises a first phase Φ1, wherein the first and fourth switching means are closed and the second and third switching means are open, resulting in the circuit of FIG. 3a. During this first phase Φ1, the coil current increases and no energy is transferred to the output.

Figure 3B:
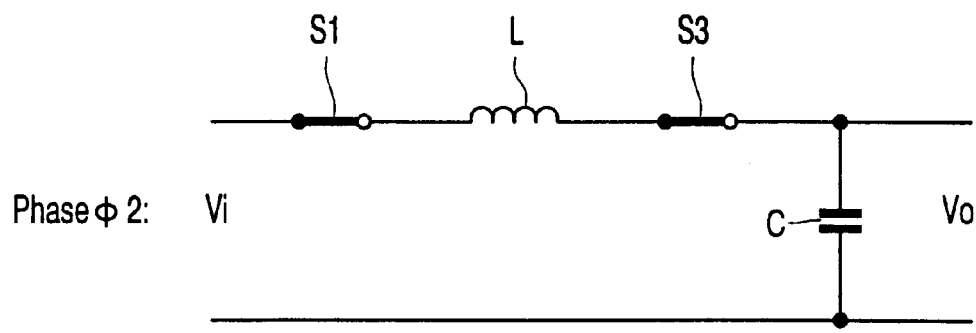

In a second phase Φ2 the first switching means S1 and the third switching means S3 are closed and the second switching means S2 and the fourth switching means S4 are open. The resulting circuit diagram is shown in FIG. 3b. During this phase, the coil current remains stable and energy is transferred to the output.

In a third phase Φ3, the first switching means S1 and the fourth switching means S4 are open and the second switching means S2 and the third switching means S3 are closed.

Figure 3C:
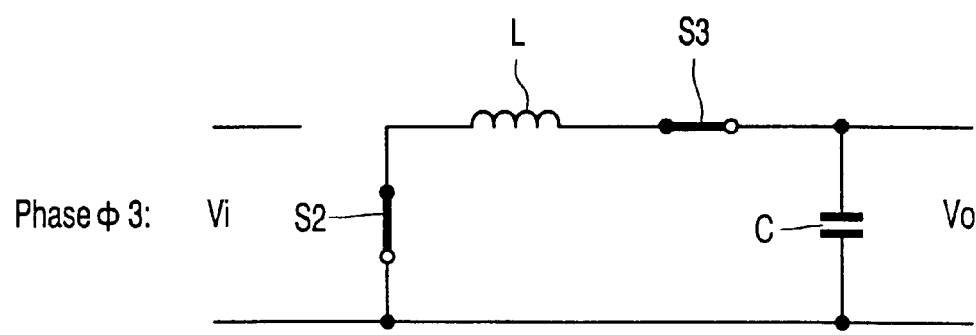

In this phase, as shown in FIG. 3c, the coil current decreases, because no energy is supplied thereto from the input, while energy is transferred to the output.

Figure 4A:
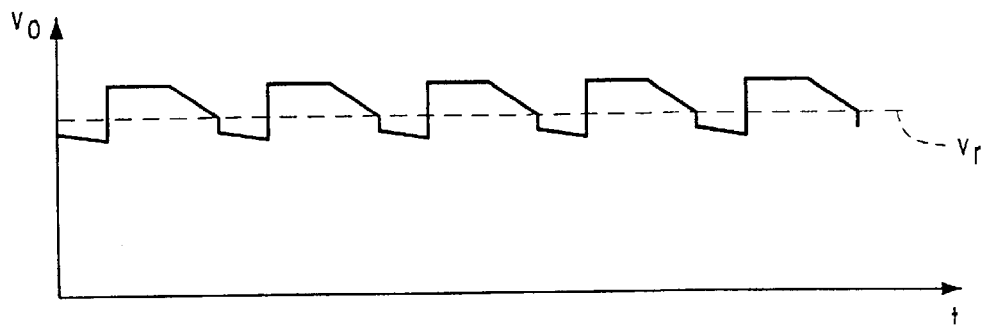
FIG. 4 shows, in a graphic representation, the output voltage and coil current in the three phase converter scheme of the DC/DC up/down converter according to the present invention, operated in continues mode.
Figure 4B:
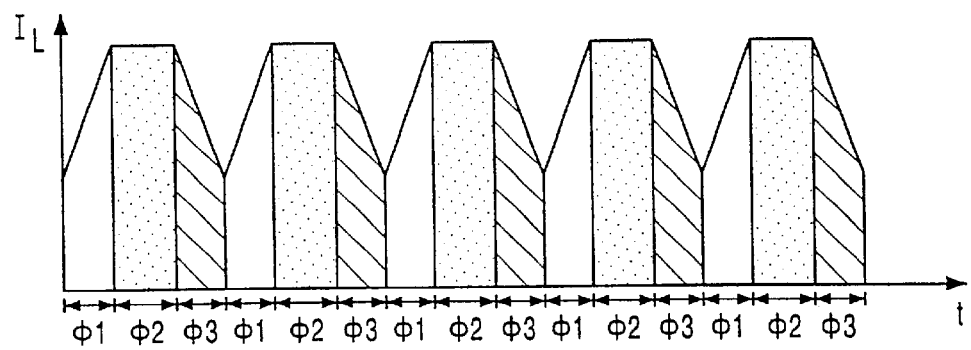
Figure 5A:
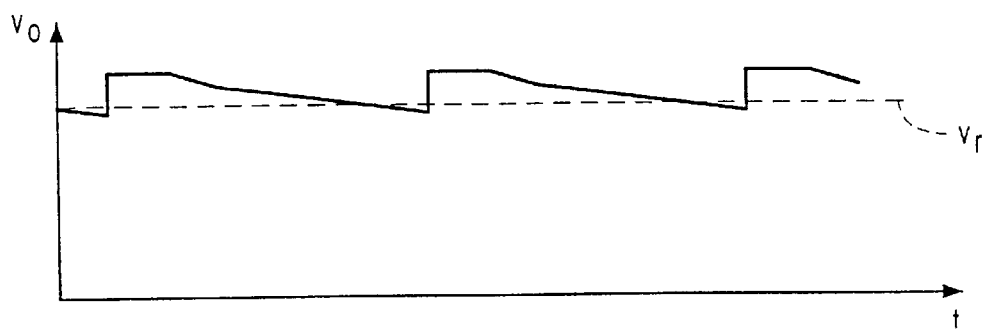
FIG. 5 shows, in a graphic representation, the output voltage and coil current in the three phase converter scheme of the DC/DC up/down converter according to the present invention, operated in discontinues mode.
Figure 5B:
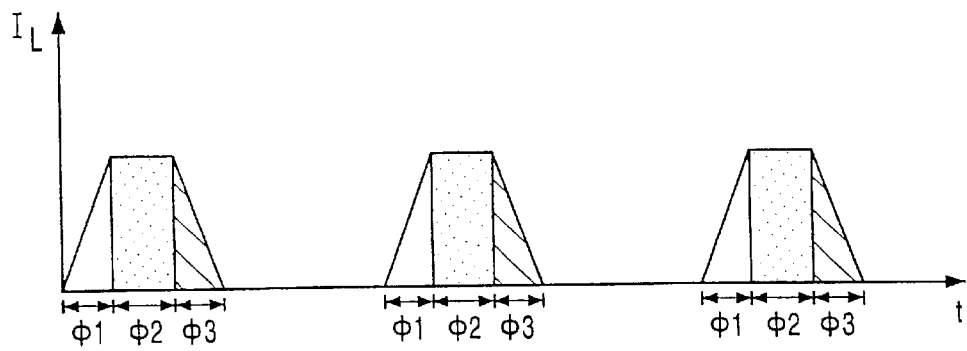

The output voltage Vo at the output terminals 30, 31 and the current $I_L$ through the coil L during continues conduction mode or PWM (Pulse Width Modulation) mode of the converter 10 are graphically shown in FIG. 4.

During phase Φ1 the coil current $I_L$ increases and remains more or less constant during the second phase Φ2. In the third phase Φ3 the coil current $I_L$ decreases resulting in a decrease of the output voltage Vo. If the output voltage Vo drops below the reference voltage Vr the converter is switched to phase Φ1, etcetera. The negative slope during phase Φ3 in the output voltage Vo is a result of the equivalent series resistance (ESR) of the smoothing capacitor C and, of course, variations in the power consumption of the load 15.

FIG. 4 shows the output voltage Vo and the coil current $I_l$ in discontinues mode or PFM (Pulse Frequency Modulation) mode, wherein the current $I_L$ through the coil L becomes zero.

In an embodiment of the invention, the first phase Φ1 and the second phase Φ2 have a fixed duration, while the third phase Φ3 is used for regulating the output voltage Vo. In PWM or continues mode, phase Φ3 ends when the output voltage Vo drops below the reference voltage Vr, as sensed by the comparator means 13. Then a new conversion cycle is started, beginning with Φ1, etcetera.

In PFM or discontinues mode, the same principle is applied. In this case the duration of the first and second phases Φ1 and Φ2 are fixed. The third phase Φ3 ends at a defined, predetermined length or if the coil current $I_L$ becomes zero. In this case, the control means 11 stay in a fourth phase Φ4 wherein all switching means are switched open until the output voltage Vo drops below the reference voltage level Vr, after which a new conversion cycle is started, to begin with the first phase Φ1.

Figures 6, 7:
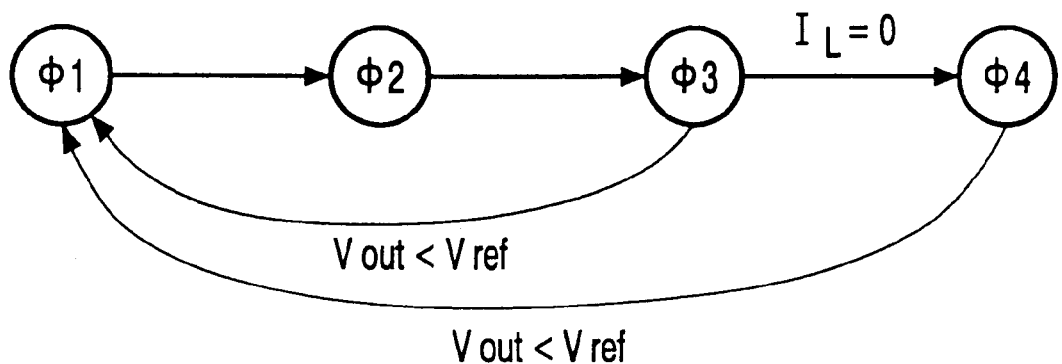
FIG. 6 shows a control state diagram of the DC/DC up/down converter according to the present invention.
FIG. 7 shows, in table form, the relation between the phase and switch drive of the DC/DC up/down converter according to the present invention.

FIG. 6 shows the operation of the control means 11 in the form of a control state diagram.

As can be seen, in the PWM or continues mode, the converter runs through the states ΦD, Φ2, Φ3 whereas in the PFM or discontinues mode a fourth phase Φ4 is introduced, as a waiting phase, once the current through the coil $I_L$ becomes zero or after a predefined duration of the third phase Φ3.

FIG. 7 shows, in the table form, the relation between the phase of the DC/DC up/down converter 10 according to the invention, and the positions i.e. states of the switching means. "on" means that the particular switching means are closed or switched in their conductive state and "off" indicates that the particular switching means is in its open of non-conductive state.

Those skilled in the art will appreciate that the second switching means S2 and the third switching means S3 can be omitted and replaced by the respective first diode D1, and second diode D2. However, to increase the power conversion efficiency of the DC/DC converter 10, the switching means S2 and S3 are preferred to avoid a relatively large voltage drop across the first and second diodes D1, D2.

The present invention, with its three phase or four phase conversion cycle provides a combined DC/DC up/down converter which needs only one reference voltage and provides a lower LF (low frequency) ripple at the regulated output voltage Vo compared to the prior art reference voltage window converter circuit.

What is claimed is:

1. A DC/DC up/down converter (10), comprising:
   first and second input terminals (20, 21);
   first and second output terminal (30, 31);
   a coil (L);
   first switching means (S1) operatively connected to provide a conduction path from said first input terminal (20) to said coil (L);
   second switching means (S2) operatively connected to provide a conduction path from said first switching means (S1) and said coil (L) to said second input terminal (21);
   third switching means (S3) operatively connected to provide a conduction path from said coil (L) to said first output terminal (30);
   fourth switching means (S4) operatively connected to provide a conduction path from said coil (L) and said third switching means (S3) to said second output terminal (31);
   control means (11) operatively connected for controlling said switching means (S1, S2, S3, S4);
   reference voltage means (12) for providing a reference voltage (Vr); and
   comparator means (13) for providing a comparison signal (Vc) for said control means (11) in response to comparison of an output voltage (Vo) at said output terminals (30, 31) with said reference voltage (Vr), characterized in that said control means (11) are arranged for controlling said switching means (S1, S2, S3, S4) in a three phase conversion cycle wherein
   phase 1 (Φ1) comprising said first switching means (S1) and said fourth switching means (S4) in a conductive state and said second switching means (S2) and said third switching means (S3) switched in a non-conductive state;
   phase 2 (Φ2) comprising said first switching means (S1) and said third switching means (S3) in a conductive state and said second switching means (S2) and said fourth switching means (S4) switched in a non-conductive state;
   phase 3 (Φ3) comprising said second switching means (S2) and said third switching means (S3) in a conductive state and said first switching means (S1) and said fourth switching means (S4) in a non-conductive state.

2. A DC/DC up/down converter (10) according to claim 1, wherein said control means (11) are arranged to comprise a fourth phase (Φ4) with said switching means (S1, S2, S3, S4) in a non-conductive state.

3. A DC/DC up/down converter (10) according to claim 1, wherein phase 1 (Φ1) and phase 2 (Φ2) having a fixed length and phase 3 (Φ3) having a variable length for output voltage (Vo) regulation purposes.

4. A DC/DC up/down converter (10) according to claim 1, wherein said switching means (S1, S2, S3, S4) comprise semiconductor switching means, in particular MOS (Metallic Oxide Semiconductor) transistor means.

5. A DC/DC converter (10) according to claim 1, wherein said second switching means (S2) are replaced by a first diode (D1) arranged to provide a conductive path from said second input terminal (21) to said first switching means (S1) and said coil (L),
   and wherein said third switching means (S3) are replaced by a second diode (D2) arranged to provide a conductive path from said coil (L) to said first output terminal (30).

6. A DC/DC up/down converter (10) according to claim 1, further comprising a capacitor (C) parallel connected to said first and second output terminals (30, 31).

7. A power supply comprising a DC/DC up/down convertor (10) according to claim 1, arranged for receiving an input voltage (Vi) at said first and second input terminals (20, 21) and for providing an output voltage (Vo) at said first and second output terminals (30, 31).

8. A portable electronic appliance (16) comprising a DC/DC up/down converter (10) according to claim 1.

* * * * *